No. 887,202.
PATENTED MAY 12, 1908.
G. E. LAUBENHEIMER.
HOP JACK.
APPLICATION FILED DEC. 9, 1907.
2 SHEETS—SHEET 1.
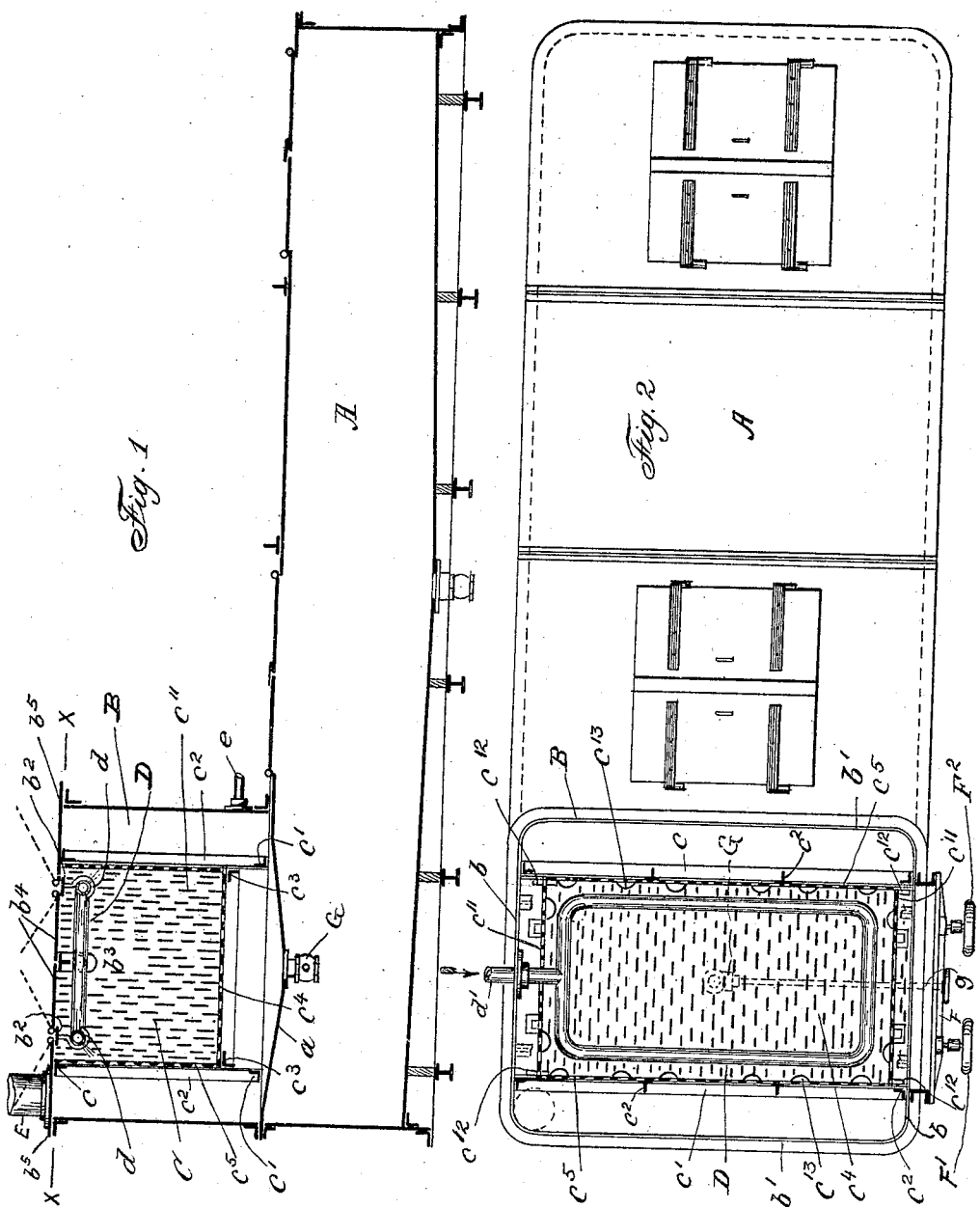
WITNESSES
Joseph Schlenker
Joe Miller
INVENTOR
George E. Laubenheimer
By Robt. Wotz
Atty.

No. 887,202.
PATENTED MAY 12, 1908.
G. E. LAUBENHEIMER.
HOP JACK.
APPLICATION FILED DEC. 9, 1907.
2 SHEETS—SHEET 2.
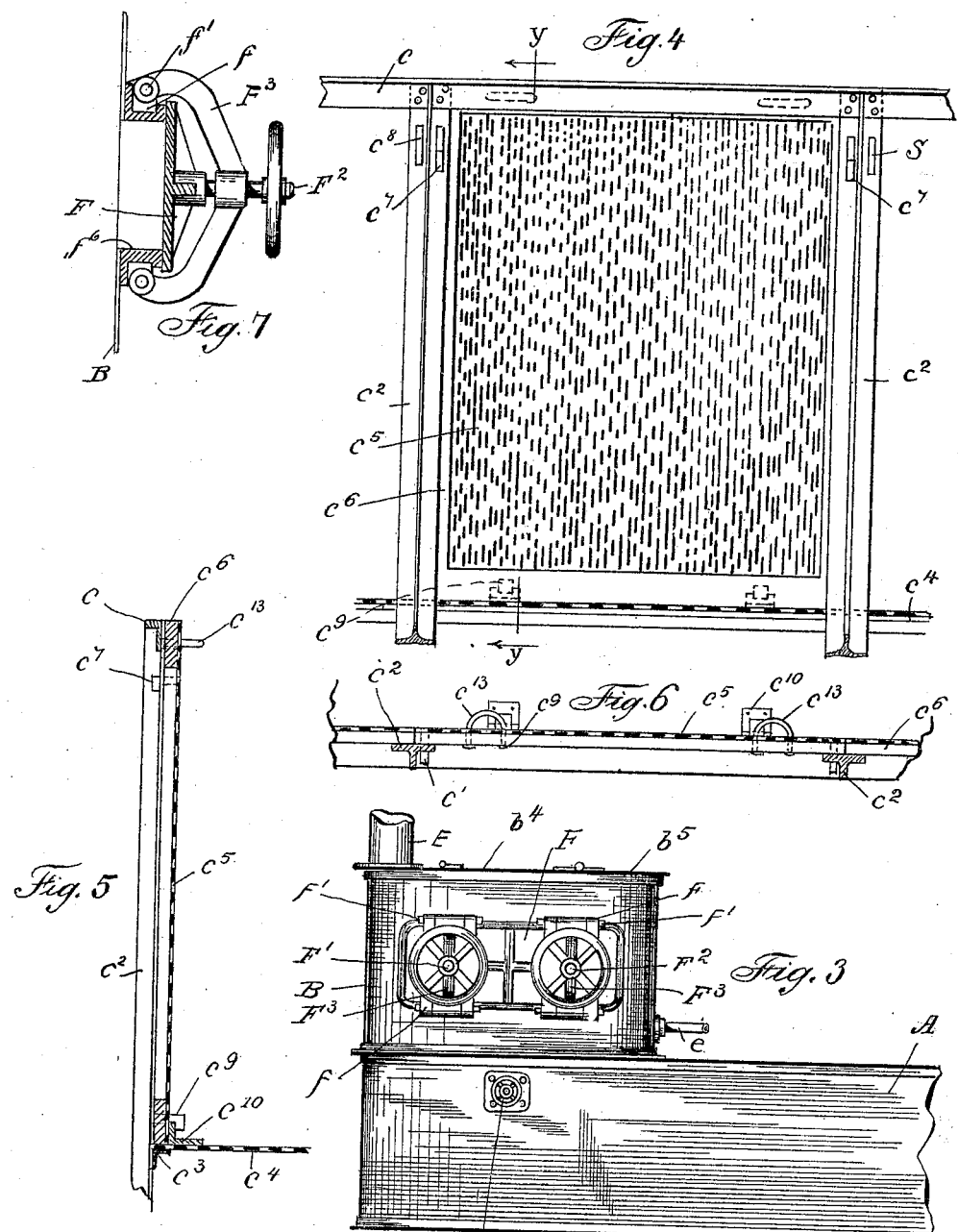
WITNESSES
Joseph Schlenker
Joe. Miller
INVENTOR
George E. Laubenheimer
By Robt. Klein
Atty.
THE NORRIS PETERS CO., WASHINGTON, D. C.

UNITED STATES PATENT OFFICE.

GEORGE EDWARD LAUBENHEIMER, OF CHICAGO, ILLINOIS.

HOP-JACK.

No. 887,202.

Specification of Letters Patent.

Patented May 12, 1908.

Application filed December 9, 1907. Serial No. 405,663.

*To all whom it may concern:*

Be it known that I, GEORGE E. LAUBENHEIMER, a citizen of the United States, residing at Chicago, in the county of Cook and State of Illinois, have invented a new and useful Improvement in Hop-Jacks, of which the following is a complete specification.

This invention relates to improvements in hop jacks and more particularly to a hop jack having a knock down filter adapted to separate the wort from the hops with great rapidity.

Heretofore it has been customary in hop jacks having stationary filtering devices to provide simply a false bottom through which the wort is drawn off from the hops, but such a construction is objectionable because of the fact that the hops settle down to the bottom and soon clog it, thereby not only retarding the filtration but ofttimes causing the wort to remain for too long a period in contact with the hops and imparting to it a bitter rank taste.

The object of this invention is to provide a hop jack in which the filtering device is provided with perforated side and end walls as well as with a perforated bottom through which the wort may escape, so that it is drained off from the hops much more rapidly than when only a perforated bottom is employed and is prevented from standing in contact with the hops for too long a period.

It is a further object of the invention to provide a hop jack in which the filtering device is constructed in sections, each adapted to be removed independently of the other, for convenience of cleaning or repairing.

The invention consists of the matters hereinafter described in the specification and more fully pointed out and defined in the appended claims.

In the drawings: Figure 1 is a vertical, longitudinal section of a beer storage tank having a hop jack embodying my invention mounted thereon. Fig. 2 is a fragmentary section of the hop jack taken on line $x$—$x$ of Fig. 1, and showing the tank in plan view. Fig. 3 is a fragmentary view showing the hop jack in end elevation. Fig. 4 is an enlarged, fragmentary side elevation of the filter. Fig. 5 is a section taken on line $y$—$y$ of Fig. 4. Fig. 6 is a fragmentary, top plan view of the filter, partly in section. Fig. 7 is a vertical section of the hop jack receptacle and manhole closure therefor.

As shown in said drawings: A indicates a beer storage tank of any desired material and construction and upon which the hop jack is mounted above a depressed portion $a$ of its top. Said hop jack comprises an outer shell or receptacle B of any desired material, preferably of a non-corrodible sheet metal, which may be bolted or otherwise secured to the top of the tank, and within said shell is the filter indicated as a whole by C, which is constructed in the following manner. A frame is provided comprising upper and lower longitudinal beams $c$ and $c'$ of angle bars or other preferred material which extend between the ends $b$ of the receptacle B, and are spaced a distance from the side walls $b'$ thereof. Posts $c^2$ constructed of T bars or other preferred material connect said upper and lower beams, and rigidly engaged to the inner sides of said posts are the sills $c^3$ upon which the perforated bottom $c^4$ of the filter rests. The side walls of the filter are constructed of a plurality of perforated sections $c^5$ of metal, each of which is provided with a strengthening frame $c^6$ attached to its margins. Said sections may be supported in place in any desired manner but as shown they are provided near their upper edges with outwardly directed hooks $c^7$ adapted to engage in slots $c^8$ in the posts $c^2$, and near their lower edges with inwardly projecting hooks $c^9$, each adapted to engage over the upturned flange of an angle plate $c^{10}$ rigidly engaged on the bottom $c^4$. The end walls $c^{11}$, as shown, are constructed of one piece, though obviously they may be made in section if desired, and are secured in place at their bottoms similarly to the side sections, and at their tops are supported by cleats $c^{12}$ on the side sections. Handles $c^{13}$ are provided near the top of each section on its inner face and by means of which the sections may be removed and replaced if desired.

The receptacle B is provided at its top with girders $b^2$—$b^2$ which extend longitudinally thereof near the side walls of the filter, and with a girder $b^3$ intermediate the same. Covers $b^4$ are hinged adjacent the girders $b^2$ and cover the space between said girders, and covers $b^5$, likewise hinged to said girders, cover the spaces between the side walls of the filter and the sides of the receptacle.

A sprinkler D comprising a perforated pipe is suspended from the girders $b^2$ by means of the hooks $d$ and is provided with an inlet pipe $d'$ leading from any suitable source of supply. The receptacle is also provided at its top with a vent pipe E leading to the atmosphere and near its bottom with an air inlet pipe e by means of which the circulation of air in the receptacle may be provided to carry off the odors from the wort.

At one end of the receptacle a manhole is provided, the bottom of which is on a level with the bottom of the filter and through which the hops may be removed in any preferred manner. A flange $f^6$ is provided about the manhole and a plate F is adapted to fit tightly against said flange and close the hole. Said plate is secured in place by means of set screws or bolts F' and $F^2$ having threaded engagement in brackets $F^3$, the ends of which are apertured and secured between apertured bosses $f$ on said flange by means of pins $f'$ extending through the same and said bosses. A valve G of any preferred construction controls the aperture in the depressed portion $a$ of the tank and is operated by means of a valve stem $g$.

When in operation the wort and hops are admitted to the filter in any preferred manner and inasmuch as the hops have a tendency to settle to the bottom the wort is free to escape through the side and end walls of the filter which remain unclogged by the hops. After the wort has drained off water is turned into the sprinkler and not only washes down the side and end walls of the filter but also washes the hops. The hops may then be removed through the manhole either by mechanical means or manually, and when the latter method is employed the operator may enter the filter by simply opening the covers $b^4$. Obviously a hop jack constructed in accordance with my invention affords a very simple and quick acting device, and obviously many details of construction may be varied without departing from the principles of my invention.

I claim as my invention:

1. In a device of the class described the combination with a receptacle of a frame therein, a perforated bottom supported on said frame, and independently removable, perforated side and end walls on said frame.

2. In a device of the class described the combination with a receptacle of a frame therein, a perforated bottom supported on said frame, sectional, perforated side walls removably engaged to said frame, and removable, perforated end walls on said bottom and side walls.

3. In a device of the class described the combination with a receptacle of a plurality of slotted posts therein, a perforated bottom plate supported on said posts, a plurality of perforated side wall sections, hooks thereon adapted to engage in the slots in said posts, interlocking means on the bottoms of said sections and said bottom plate, and perforated end walls removably engaged between the side walls.

4. In a device of the class described the combination with a receptacle of a frame therein, a perforated bottom supported in said frame, perforated sectional side walls, means adapted to removably engage said walls to the frame and bottom, a sprinkler above said bottom and covers on the receptacle opening from the center and sides thereof.

5. In a hop jack the combination with a receptacle of a filter therein comprising a frame, a perforated bottom and walls, means interlocking said walls with the bottom and frame, a sprinkler in said filter adapted to wash down the walls and covers on the top of the receptacle adapted to close the same and the filter.

6. In a device of the class described the combination with a storage tank having a depressed top portion, a valve controlling an opening at the lowest point of said portion, a receptacle rigidly engaged on the tank, above said depressed portion, a frame therein, a knock-down filter supported on said frame, a sprinkler in said filter, air pipes opening into said receptacle, and covers closing said receptacle and filter.

7. In a hop jack the combination with a receptacle having a manhole in one end thereof, a plate adapted to close said hole, means for engaging said plate in place, a frame in said receptacle, a perforated bottom plate on said frame, perforated, sectional walls removably engaged on said frame and bottom plate, and handles on each wall section.

8. In a device of the class described the combination with a receptacle of a frame therein, a perforated bottom supported on said frame, perforated side and end walls, means for locking said walls to the bottom and frame, and handles on said walls.

9. In a device of the class described the combination with a receptacle of a frame therein, a filter supported on said frame and comprising perforated side and end walls and a perforated bottom, means removably engaging said side and end walls in place, a sprinkler supported in the top of said receptacle and adapted to wash down the side and end walls thereof, and covers on said receptacle adapted to open into the filter and between the filter and side walls of the receptacle.

In testimony whereof I have hereunto subscribed my name in the presence of two witnesses.

GEORGE EDWARD LAUBENHEIMER.

Witnesses:
 ROBT. KLOTZ,
 JOHN WHITLOCK.